United States Patent
Venkataswami et al.

(10) Patent No.: US 9,231,863 B2
(45) Date of Patent: Jan. 5, 2016

(54) SYSTEMS AND METHODS FOR A DATA CENTER ARCHITECTURE FACILITATING LAYER 2 OVER LAYER 3 COMMUNICATION

(71) Applicant: Dell Products L.P., Round Rock, TX (US)

(72) Inventors: Balaji Venkat Venkataswami, Tamilnadu (IN); Bhargav Bhikkaji, San Jose, CA (US); NarayanaSwamy Perumal, Tamilnadu (IN); Prasadu Beesabathina, Andhra Pradesh (IN)

(73) Assignee: Dell Products L.P., Round Rock, TX (US)

( * ) Notice: Subject to any disclaimer, the term of this patent is extended or adjusted under 35 U.S.C. 154(b) by 151 days.

(21) Appl. No.: 13/949,106

(22) Filed: Jul. 23, 2013

(65) Prior Publication Data
US 2015/0030024 A1  Jan. 29, 2015

(51) Int. Cl.
*H04L 12/28* (2006.01)
*H04L 12/741* (2013.01)
*G06F 9/455* (2006.01)
*H04L 12/713* (2013.01)

(52) U.S. Cl.
CPC ............ *H04L 45/74* (2013.01); *G06F 9/45533* (2013.01); *H04L 45/586* (2013.01)

(58) Field of Classification Search
None
See application file for complete search history.

(56) References Cited

U.S. PATENT DOCUMENTS

| | | | |
|---|---|---|---|
| 2011/0283017 A1* | 11/2011 | Alkhatib et al. | 709/244 |
| 2012/0014387 A1* | 1/2012 | Dunbar et al. | 370/395.53 |
| 2012/0324035 A1* | 12/2012 | Cantu et al. | 709/213 |
| 2013/0086236 A1* | 4/2013 | Baucke et al. | 709/223 |
| 2013/0125124 A1* | 5/2013 | Kempf et al. | 718/1 |
| 2013/0136126 A1* | 5/2013 | Wang et al. | 370/392 |
| 2013/0170354 A1* | 7/2013 | Takashima et al. | 370/235 |
| 2013/0266019 A1* | 10/2013 | Qu et al. | 370/395.53 |
| 2013/0308641 A1* | 11/2013 | Ackley | 370/392 |
| 2013/0322443 A1* | 12/2013 | Dunbar et al. | 370/390 |
| 2013/0329605 A1* | 12/2013 | Nakil et al. | 370/255 |
| 2014/0006585 A1* | 1/2014 | Dunbar et al. | 709/223 |
| 2014/0075047 A1* | 3/2014 | Narasimhan et al. | 709/238 |
| 2014/0098815 A1* | 4/2014 | Mishra et al. | 370/390 |
| 2014/0250220 A1* | 9/2014 | Kapadia et al. | 709/224 |

* cited by examiner

*Primary Examiner* — Otis L Thompson, Jr.
(74) *Attorney, Agent, or Firm* — Haynes and Boone, LLP (57) ABSTRACT

An information handling system is provided. The information handling system includes a plurality of core devices coupled to each other and to a plurality of distribution devices and a plurality of top-of-rack devices coupled to a plurality of servers and to the distribution devices. The plurality of servers are running hypervisors thereon that each manage a virtual switch and a plurality of virtual machines (VMs). The information handling system further includes a plurality of local network address resolution mediators, with each local network address resolution mediator running on one of the plurality of servers and receiving packets from VMs running thereon, and a global network address resolution mediator running on one of the plurality of core devices. The global network address resolution mediator is in communication with each of the plurality of local network address resolution mediators to collect and distribute packets from the plurality of VMs.

20 Claims, 5 Drawing Sheets

SYSTEMS AND METHODS FOR A DATA CENTER ARCHITECTURE FACILITATING LAYER 2 OVER LAYER 3 COMMUNICATION

BACKGROUND

1. Technical Field

The present disclosure is related to information handling systems. In particular, embodiments disclosed herein are related to data center implementation and management.

2. Discussion of Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Currently, there is increasing demand and use of data centers to provide businesses and consumers with access to vast amounts of data and services. Some data centers include large numbers of servers networked together by a layer of top-of-rack switches, which in turn are coupled to a layer of distribution switches, which are further coupled to a group of core switches. While some data centers are operated and used by a single entity, many data centers provide compute, storage, and/or networking resources for more than one entity. This often requires isolation between traffic associated with one entity and traffic associated with a different entity. Overlay network virtualization is a tool that has been used in satisfying the requirements of isolation. Some implementations rely on certain hardware that supports bidirectional Protocol Independent Multicast (PIM). However, many makes of hardware don't support bidirectional PIM. For this and other reasons, the current implementations have not proven satisfactory in all respects.

SUMMARY

Consistent with some embodiments, there is provided an information handling system. The information handling system includes a plurality of core devices coupled to each other and to a plurality of distribution devices and a plurality of top-of-rack devices, each top-of-rack device being coupled to at least one of the plurality of distribution switches. The information handling system further includes a plurality of servers coupled to the plurality of top-of-rack devices. At least some of the plurality of servers have hypervisors running thereon that each manage a virtual switch and a plurality of virtual machines (VMs). The information handling system also includes a plurality of local network address resolution mediators and a global network address resolution mediator running on one of the plurality of core devices. Each local network address resolution mediator runs on one of the plurality of servers and receives packets from VMs running thereon. The global network address resolution mediator is in communication with each of the plurality of local network address resolution to collect and distribute packets from the plurality of VMs.

Consistent with other embodiments of the present disclosure, there is disclosed herein a method for overlaying a virtual network with a multicast tree over a physical network. The method includes steps of receiving an network address resolution packet at a virtual switch in communication with a virtual machine (VM) running on a first server, with the network address resolution request including address information of the VM, and of collecting the address information from the network address resolution packet in a local network address resolution mediator, with the local network address resolution mediator running on the first server. The method further includes steps of collecting the address information in a global network address resolution mediator running on a network device located a distance away from the first server in the physical network, and of transmitting the address information from the global network address resolution mediator to a plurality of other local network address resolution mediators, with each of the local network address resolution mediators running on a server other than the first server.

Consistent with some embodiments, there is further provided a non-transitory, computer-readable medium containing programmed instructions. The program instructions are for overlaying a virtual network with a multicast tree over a physical network, and when executed by one or more processors cause the one or more processors to perform a method for overlaying a virtual network with a multicast tree over a physical network.

These and other embodiments will be described in further detail below with respect to the following figures.

For clarity of discussion, elements having the same designation in the drawings may have the same or similar functions. The drawings may be better understood by referring to the following Detailed Description.

DETAILED DESCRIPTION

In the following description specific details are set forth describing certain embodiments. It will be apparent, however, to one skilled in the art that the disclosed embodiments may be practiced without some or all of these specific details. The specific embodiments presented are meant to be illustrative, but not limiting. One skilled in the art may realize other material that, although not specifically described herein, is within the scope and spirit of this disclosure.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Additionally, some embodiments of information handling systems include non-transient, machine-readable media that include executable code that when run by a processor, or more than one processor, may cause the processor to perform the steps of methods described herein. Some common forms of machine-readable media include, for example, floppy disk, flexible disk, hard disk, magnetic tape, any other magnetic medium, CD-ROM, any other optical medium, any other physical medium, RAM, PROM, EPROM, FLASH-EPROM, any other memory chip or cartridge, and/or any other medium from which a processor or computer is adapted to read.

Figure 1:
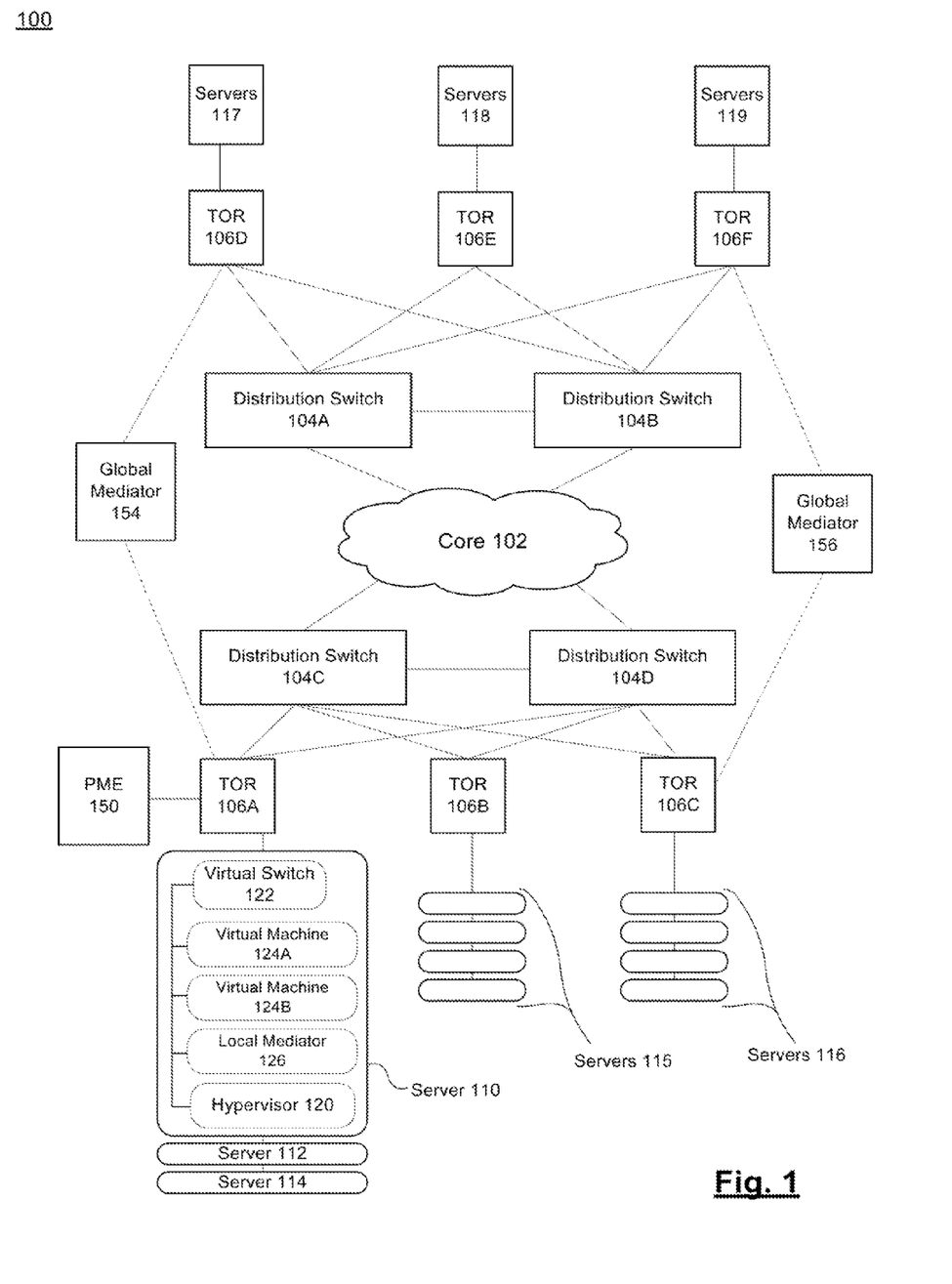
FIG. 1 is a diagram of an information handling system including a core connecting a plurality of servers.

FIG. 1 depicts an information handling system 100 such as may be present in a data center environment. As depicted, the information handling system 100 includes a significant number of connected devices, however many implementations of the system 100 may include many more connected devices than are depicted. The connected devices included in the information handling system 100 include hosts, servers, switches, routers, and combinations thereof, such as top-of-rack switches and distribution/aggregation switches. The switches and devices present in information handling system 100 may be configured for Layer 2 (L2) communication, Layer 3 (L3) communication, and or a combination of Layer 2 and Layer 3 communication.

At its topological center the information handling system 100 includes a plurality of core devices labeled as a core 102. The core 102 may include a plurality of routers and network appliances. Within the core 102, a L3 protocol may be used for forwarding packets, such as an interior gateway protocol (IGP). For example, in one embodiment, the core 102 utilizes the Open Shortest Path First (OSPF) protocol, while in another the core 102 operates with an Intermediate System to Intermediate System (IS-IS) protocol. In the depicted embodiment, core 102 includes a plurality of L3 routers and at least two appliances. Proximate to the core 102 are four distribution switches: distribution switches 104A, 104B, 104C, and 104D. The distribution switches 104A-D may also be referred to as aggregation switches and may provide a point of ingress and or egress to the core 102 for packets originating behind a plurality of connected top-of-rack devices.

As depicted, the information handling system 100 includes six top-of-rack devices or top-of-rack switches (TORs), each of which is coupled to at least two of distribution switches 104A-D. The depicted top-of-rack switches include a TOR 106A, a TOR 106B, and a TOR 106C, each being coupled to distribution switches 104C and 104D. The system 100 further includes a TOR 106D, a TOR 106E, and a TOR 106F, these TORs each being coupled to distribution switches 104A and 104B. Each of the TORs 106A-F may be coupled to two distribution switches in a triangular virtual link trunking (or similar) implementation. Each of the TORs 106A-F serves as the top-of-rack device for a plurality of servers or hosts.

To simply this disclosure, FIG. 1 depicts a few individual servers 110, 112, and 114, but depicts many others servers as pluralities of servers 115, 116, 117, 118, and 119. A plurality of servers located in a single chassis may be served by a single TOR device. Thus, TOR 106A is depicted in communication with servers 110, server 112, and server 114. Accordingly, servers 110, 112, and 114 may be located in a single chassis having TOR 106A connecting the servers to the distribution switches 104C and 104D, and thereby to the core 102. In some embodiments, the TOR acts as the default gateway for all the servers coupled to it. When a server sends a packet to an IP address located outside the chassis, the packet travels through the TOR, before being routed toward the destination.

FIG. 1 provides more detail regarding an exemplary server 110 that is applicable in many ways to the other servers depicted. Server 110 includes one or more processors, memory in communication with the processors, and one or more network interface cards (NICs). Additionally, a hypervisor 120 running on the server 110 manages a number of virtual applications, machines, and/or devices. For example, hypervisor 120 manages a virtual switch 122 that acts as a switch for a plurality of virtual machines (VMs). In the depicted embodiment, virtual switch 122 and other virtual switches in information handling system 100 are Open vSwitch implementations.

While the server 110 may have 30, 40, or more than 100 virtual machines, only two such virtual machines are depicted for simplicity: VMs 124A and 124B. Each of VMs 124A and 124B are assigned a virtual Media Access Control (MAC) address and a virtual Internet Protocol (IP) address, and each VM includes at least one virtual NIC. When VM 124A sends a packet to VM 124B, the packet may first be transmitted to the virtual switch 122 which then, acting a switch for the VMs on server 110, directs the packet to VM 124B. This may be done using only the virtual addresses of VMs 124A and 124B as the source and destination addresses in the packet. If the packet from VM 124A is intended for a VM on a different server, the packet may be directed to TOR 106A. From TOR 106A, the packet may be sent to one of servers 112 or 114, or the packet may be transmitted to one of distribution switches 104C and 104D. When the packet is transmitted to one of distribution switches 104C and 104D, the packet may be first encapsulated by the server 110 with an outer MAC header and an outer IP header to by the distribution switches and/or core 102.

A local network address resolution mediator local mediator 126 is also depicted running on the server 110. The local mediator 126 is a local entity or application running as a virtual machine on server 110. In some embodiments, an additional local mediator may be running on the server 110 as well, and may provide redundancy and/or load balancing capability. More detail about the local network address resolution mediator 126 is provided further below.

The information handling system 100 further includes a network management system or provisioning and mapping entity (PME) 150 that is coupled to the network of information handling system 100. As depicted, the PME 150 is coupled to the TOR 106A and therethrough communicates with other devices in information handling system 100. The PME 150 is configured to allow a data center operator to instantiate, relocate, and/or terminate virtual machines, virtual switches, and/or virtual applications running on any of the physical servers in the information handling system 100. The PME 150 may be a program being executed by a processor on a server and may have a database of information regarding the VMs deployed within the information handling system 100 and stored in memory.

Many of the features of information handling system 100 as depicted in FIG. 1 serve as the underlying, physical network for an overlay virtualized network running thereover. Each of the physical servers, like the server 110 serves as a tunnel endpoint. For instance, the server 110 may be virtual tunnel endpoint (VTEP) in a virtual extensible local area network (VXLAN) implementation. As a VTEP for at least one associated tunnel, the server 110 encapsulates and decapsulated packets as needed for operation of the tunnel. Other encapsulation protocols may be used in other embodiments of information handling system 100, such as Network Virtualization using Generic Routing Encapsulation (NVGRE), or a stateless transport tunneling (STT) protocol. The PME 150 acts as a network controller in the creation of the associated tunnels.

When a VM is instantiated on a server, the presence and address of the VM is advertised into the information handling system 100, by sending a gratuitous network address resolution packet, such as an Address Resolution Protocol (ARP) packet or a Neighbor Discovery Protocol (NDP) packet. For example, when VM 124A is instantiated by PME 150, it sends an ARP packet that is trapped by the virtual switch 106. The ARP packet is gratuitous in the sense that it is not send in response to a reply. The ARP packet includes one or more identifiers of VM 124A including its associated virtual MAC address and/or its virtual IP address.

After the virtual switch 122 traps the ARP packet, it directs the packet to local mediator 126. The local mediator 126 is a virtual application or a VM running on the hypervisor 120. The local mediator 126 is configured to receive network address resolution packets, such as ARP replies, ARP requests, and other such packets. When the local mediator 126 receives the gratuitous ARP packet from VM 124A, local mediator 126 extracts information regarding the currently assigned MAC and IP addresses associated with VM 124A. This extracted information is stored in a database in memory accessible to the local mediator 126. In order for other VMs in information handling system 100 to be able to communicate with VM 124A, the local mediator 126, send the information, sends the packet, which may be a copy thereof, to one of global network address resolution mediators 154 and 156.

The global network address resolution mediators 154 and 156 are also referred to as route reflectors, global ARP mediators, or global mediators 154 and 156 herein. In FIG. 1, the global mediators 154 and 156 are depicted as being coupled to TORs 106A, 106C, 106D, and 106F by a set of virtual links. However, in the depicted embodiment of information handling system 100, the global mediators 154 and 156 are each running on one of the plurality of network devices that form core 102, and are coupled to the TORs. Thus, each of TORs 106A-F may be coupled in communication with the global mediators 154 and 156 running on routers in core 102. In this example, the local mediator 126 sends the ARP packet to the global mediator 154. In some embodiments, the local mediator 126 communicates with the global mediator 154 through a Transmission Control Protocol (TCP) session over a Border Gateway Protocol (BGP) session between the hypervisor 120 and global mediator 154. In some embodiments, the global mediator 154 may share the information with the global mediator 156. Thereafter, if a packet is sent by another VM running on a different server to VM 124A and the local mediator associated with that other VM does not have address information for a destination of the packet, the local mediator may request the information from the global mediator.

In information handling system 100, each of the global mediators is configured at the root of a PIM Sparse Mode (PIM-SM) tree. In general, in information handling system 100 there is one global mediator with one associated PIM-SM tree per tenant. As part of forming the PIM-SM tree, the local mediator on each server having VMs associated with a given tenant joins into the PIM-SM tree. Broadcast packets sent by associated VMs are intercepted by the virtual switch associated with the hypervisor on which the VMs are running. For example, VM 124A sends a broadcast packet, which is intercepted by virtual switch 122. The virtual switch 122 then sends the broadcast packet through a TCP connection to the global mediator 154, from which it is distributed to the associated VMs, those VMs in the same tenant as VM 124A.

The virtual switch 122 and local mediator 126 are also used to redirect unicast traffic in which the address of the destination is unknown and for Layer 2 multicast traffic, such as may be present in a virtual local area network (VLAN), and for broadcast traffic. These types of network traffic may be referred to collectively as BUM traffic. This traffic may be trapped by the virtual switch 122 and sent through a TCP connection to the global mediator 154, which functioning as the root of a PIM-SM tree, distributes the traffic to associated VMs throughout information handling system 100. The global mediators may be further configured to distribute incremental updates to the local mediators through the system. For example, the local mediators may receive an update when a VM is instantiated elsewhere in information handling system 100 as discussed above. Greater detail regarding the operations of information handling system 100 in handling BUM traffic will be given below.

In effort to prevent broadcast traffic from being routed other than through the virtual switch to the global mediator, the associated TOR may be configured to prevent broadcast traffic from leaking to the distribution switches and into the core. This may be done by configuring the TORs to block traffic having a MAC address FF:FF:FF:FF:FF:FF.

Where the VMs of more than one tenant are present on a single physical server, like server 110, the traffic may be isolated by having a virtual routing and forwarding (VRF) implementation associated with each tenant operating on each TOR in information handling system 100. Each VRF instance includes a routing and forwarding table having the address information for the VMs of the particular tenant associated with the particular VRF instance.

Figure 2:
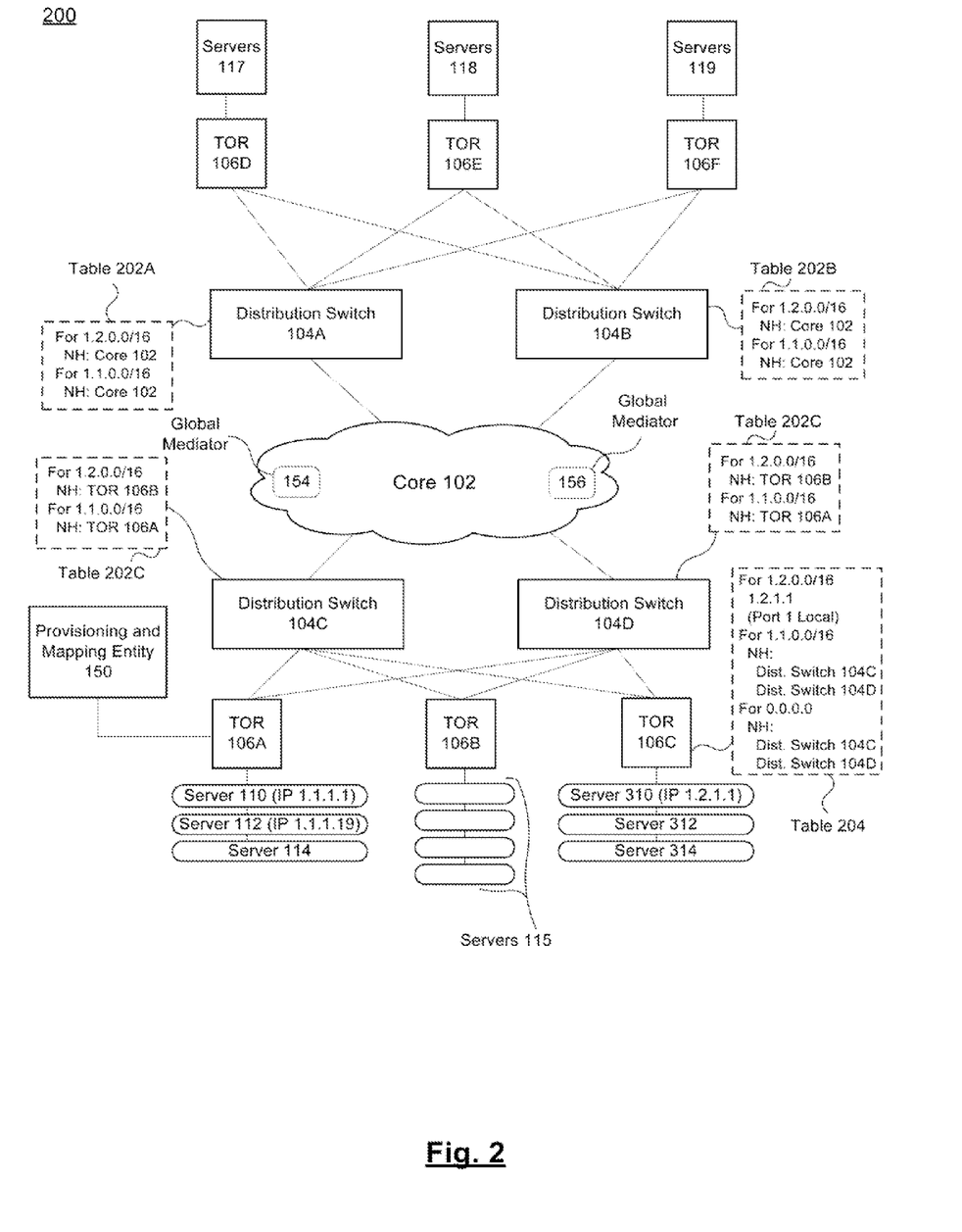
FIG. 2 is a diagram of an information handling system illustrating the distribution of address information within the information handling system.

FIG. 2 depicts an information handling system 200, which is similar in many respects to the information handling system 100 depicted in FIG. 1. Information handling system 200 includes a core 102 of IP routers running an interior gateway protocol. The core 102 is accessed directly by distribution switches 104C and 104D, which in turn are each connected to TORs 106A, 106B, and 106C. As in information handling system 100, TOR 106A is coupled to individual servers 110, 112, and 114. Individual servers 310, 312, and 314 are also depicted in FIG. 2. TOR 106B is coupled to a plurality of servers 115, while TOR 106C is coupled to a plurality of servers 116. Information handling system 200 also includes a PME 150 coupled to TOR 106A. Unlike in FIG. 1, the global mediators 154 and 156 are depicted as components within the core 102.

FIG. 2 also depicts a number of routing, switching, or forwarding tables that are present in the memory of some of the components of the information handling system 200. For instance, table 202A is stored in memory on the distribution switch 104A, table 202B represents information stored in memory on the distribution switch 104B, and so on. Table 204 depicts exemplary information stored in memory on TOR 106C. The information stored in tables 104A-D and table 204 is used to direct traffic through the information handling system 200.

For example, when the TOR 106D transmits a data packet to the distribution switch 104A that includes 1.2.1.1 as its destination IP address, table 202A indicates the next hop (NH) of the packet is core 102. The distribution switch then forwards the packet out on a port coupled to the core 102. In some embodiments, this may entail hashing the packet on one of a plurality of ports coupled to the core 102. Devices within the core 102 make similar queries of internal tables and perform forwarding operations until the packet reaches either distribution switch 104C or 104D. The tables of both of these switches, table 202C and table 202D, respectively, indicate that the next hop for packets having a destination address that matches 1.2.0.0/16 is to TOR 106C. The table 204 indicates that for IP addresses matching the 1.2.0.0/16 address, the packets should be sent on a local port 1, which is coupled to the server 310.

The tables 202A-D and table 204 may be populated through protocols such as the Routing Information Protocol (RIP), Open Shortest Path First (OSPF), Intermediate System to Intermediate System (IS-IS), and other protocols. In some embodiments of information handling system 200, the subnet masks may be of different sizes. Table 204 of TOR 106C further includes a default subnet 0.0.0.0 that directs packets to either distribution switch 104C or 104D in the event that an appropriate address match is not found within the table 204.

Figure 3:
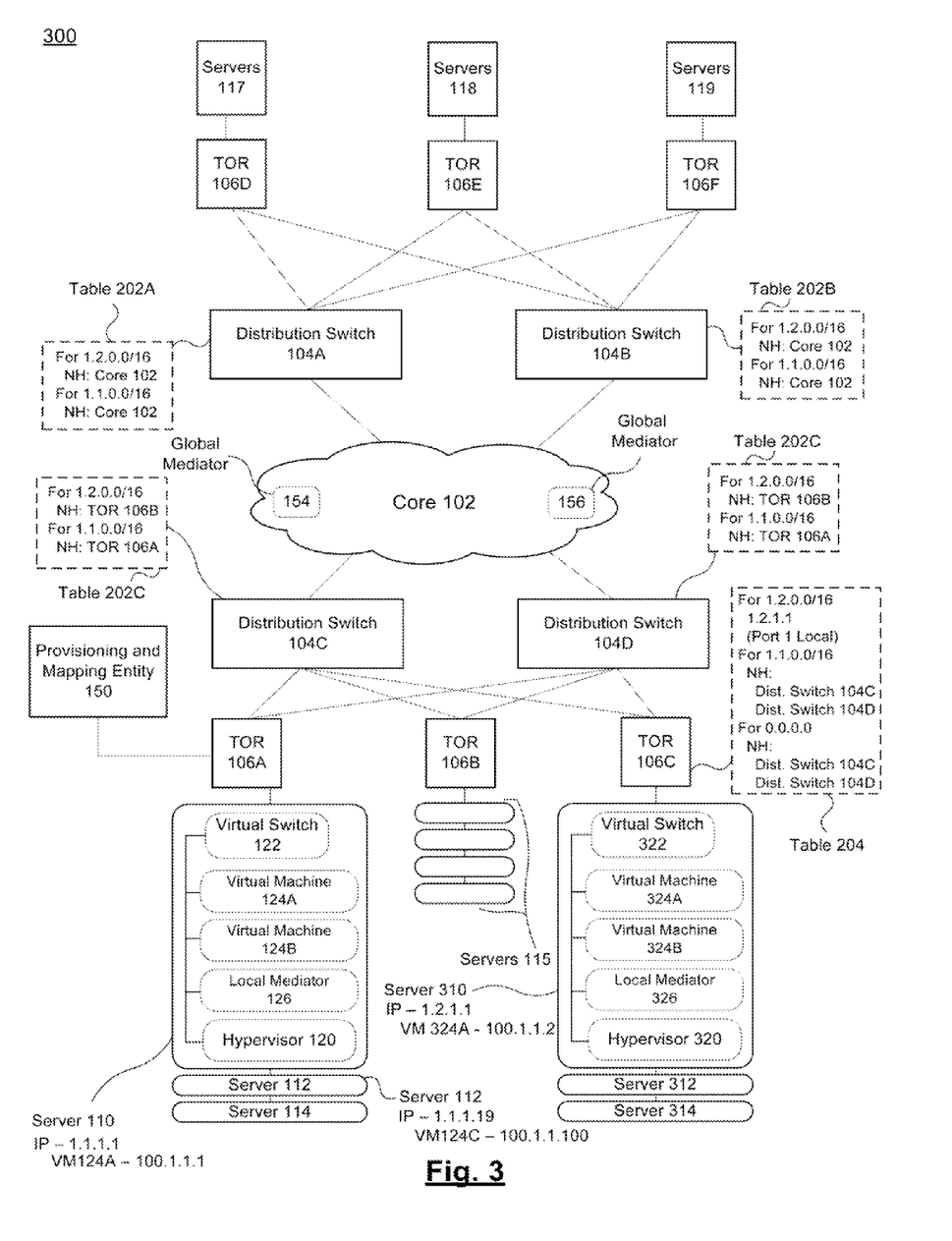
FIG. 3 is a diagram of an information handling system including address information of a number of virtual machines.

FIG. 3 depicts an information handling system 300 which is similar in many respects to information handling systems 100 and 200. The system includes the components first presented in FIG. 1, and the tables includes in FIG. 2. FIG. 3 provides an illustration of how the local mediators and the global mediators may provide an L2 overlay over the L3 core 102 and distribution switches.

In FIG. 3, a first VM 124A is instantiated on server 110 having an IP address of 1.1.1.1. VMs in information handling system 300 may be instantiated by a data center operator using the PME 150. The PME 150 assigns a virtual IP address of 100.1.1.1 and a virtual MAC address to the VM 124A. If VM 124A is the first VM for a tenant, an address for L2 broadcast and network address resolution is assigned. In this example, 225.0.0.1 is assigned by the PME 150 for this purpose. Server 110 sends an Internet Group Management Protocol (IGMP) join message with the broadcast address to the local network address resolution module, the local mediator 126. The local mediator 126 is configured to recognize the IGMP join message and query the PME 150 regarding the broadcast address. The PME 150 may respond with an indication that the 225.0.0.1 address is for BUM traffic and network address resolution associated with the tenant. Local mediator 126 then registers 225.0.0.1 as being associated with ARP mediation, broadcast, unknown unicast, and Layer 2 multicast for the tenant. The local mediator 126 also initiates a 225.0.0.1 Protocol Independent Multicast (PIM) join to the global mediator 154, which may function as the rendezvous point of a multicast tree for the tenant.

The VM 124A sends out a gratuitous ARP packet which is trapped by the virtual switch 122 which relays the packet to the local mediator 126. The ARP packet may include the virtual MAC and IP addresses to the VM 124A, as well as the MAC and IP addresses of the server on which it runs, server 110. In order to disseminate the information contained in the ARP packet to other VMs belonging to the tenant, the local mediator 126 sends the gratuitous ARP packet on to the global mediator 154 or to the global mediator 156. The receiving global mediator extracts the ARP information for VM 124A into a database associated with the tenant. The global mediator may then communicate the update to other local mediators, like local mediator 326 on server 310, through updates or by sending copies of the ARP packet. In this way the ARP information for the VM 124A is available locally and globally within the information handling system 300.

Rather than wait for ARP requests for address information of VM 124A from other VMs, the receiving global mediator sends the information from the gratuitous ARP packet or sends the gratuitous ARP packet in a multicast update through a multicast tree rooted at the global mediator for 225.0.0.1. When the multicast update is sent through the multicast tree, the receiving global mediator may synchronize with other global mediators present in the information handling system. The local mediators are the members of the multicast group and are leaves on the multicast tree rooted at the global mediator receive the multicast update and recognize it as a gratuitous ARP packet.

In embodiments in which a single tenant is present in the information handling system 300, the gratuitous ARP packet is communicated to all servers having VMs running thereon as all the VMs are part of the tenant. During such a process TOR 106A may register information such as addresses regarding VM 124A and server 110. For example TOR 106A may register an address of server 110 as 1.1.1.1 and a group distinguisher or tenant identifier as zero for the tenant. This may occur when a server is added behind the particular TOR. Some embodiments of the information handling system 300 include multiple tenants. In such embodiments, the broadcast address 225.0.0.1 is assigned to a single tenant, while other tenants are each allocated their own broadcast address. The local mediators, such as local mediators 126 and 326, as well as the global mediators 154 and 156 may be configured to maintain separate databases for each tenant, and to add tenant identifiers to the packet headers being sent by VMs.

When the global mediator 154 sends out the gratuitous ARP packet on the PIM-SM multicast tree to the registered local mediators, the hypervisors running on the associated servers may receive the packet and filter it. For example, if a hypervisor only supports virtual machines of a single tenant the hypervisor may pass the packet onto all of its virtual machines. If only some of the VMs are members of a certain tenant, the hypervisor may send the packet only to those member VMs. If a hypervisor has no virtual machines running thereon, the gratuitous ARP packet may simply be dropped.

During the operation of the data center, a VM machine located on a particular server may need to be moved to another server. For example, VM 124A may be moved to one of the plurality of servers 119 behind TOR 106F. Once the VM 124A is moved, it sends a gratuitous ARP packet. This gratuitous ARP includes the same virtual MAC and IP address (100.1.1.1) that the VM 124A used when running on server 110, but the ARP packet now may include the MAC and IP address of the new server of servers 119 in an outer header. The new information is then updated in the local mediators, which also sends the information to the global mediators, which can distribute the update to other local mediators associated with the tenant through a multicast tree.

In some instances, a VM may be aware of the IP address of another virtual machine, but may not know the MAC address of the other virtual machine. For example, VM 324A may be aware of the IP address of VM 124A (100.1.1.1), but may not have its MAC address for L2 communication. The VM 324A may form and send an ARP request packet to request the MAC address of VM 124A. The hypervisor 320, and/or the virtual switch 322 running thereon, direct the ARP request to the local mediator 326. The local mediator 326 queries its internal tables for the MAC address associated with IP address 100.1.1.1. If the MAC address is found within the local mediator 326, the information may simply be returned to the VM 324A in an ARP reply. However, if the MAC address isn't found with the local mediator 326, the local mediator 326 may forward the ARP request on to one of global mediators 154 or 156. The receiving global mediator may send an ARP reply along the multicast tree associated with the broad address 225.0.0.1 assigned by the PME 150 for multicast for the tenant. All the associated local mediators may receive the information, and record it in internal tables. The local mediators also copy the ARP reply to each server having a VM associated with the tenant running there on. The servers, including server 310, may record the next hop for packets sent with the IP address 100.1.1.1 as their destination in their internal tables. This information may also be provided to the VM 324A, which may store the MAC address along with the IP address 100.1.1.1 of VM 124A in allocated memory.

In addition to providing functionality in the control plane through network address resolution activity as described above, the local mediators and global mediators may provide additional functionality to the data plane within information handling system 300. Through the collection and distribution of virtual IP and MAC addresses associated with IP and MAC address of the servers on which VMs run, the address information may be used for L2 unicast transmission. For example, VM 124C may send a data packet to VM 324A using the IP address 100.1.1.2 and its MAC address. Server 110 may encapsulate the packet. The encapsulation may be an IP-in-GRE (general routing encapsulation) type encapsulation, or another encapsulation protocol. The encapsulation includes the IP and MAC addresses for the server 310, which are used as the destination addresses of the packet. The packet may travel through the L3 portion of information handling system 300, being routed from TOR 106A to either distribution switch 104C or 104D, before being transmitted to TOR 106C. TOR 106C forwards the packet to server 310, which decapsulates the packet and uses the inner source IP and/or MAC address to provide the packet to VM 324A.

An example of L2 broadcast is provided in connection with the information handling system 300 of FIG. 3. VMs 124A, 124C, and 324A belong to the same broadcast domain, using the broadcast address provided by PME 150. As depicted, VMs 124A and 124C are behind the same TOR, TOR 106A, though on different servers, and VM 324A is on server 310 behind TOR 106C. Assuming that the proper IGMP joins have been sent by servers 110 and 112 to local mediator 126, and by server 310 to local mediators 326, the local mediators includes these servers associated together in a multicast group. When VM 324A sends a broadcast packet, the virtual switch 322 intercepts the packets and sends it to local mediator 326. Local mediator 326 sends the packet to global mediator 156 in a TCP session running over a BGP session between the local and global mediators. The global mediator 156 then sends the packet on the multicast tree to all the local mediators that have subscribed to the multicast stream. This may be performed using a broadcast address, 225.0.0.1, designated by the PME 150 earlier. After the local mediators of servers 110 and 112 receive the broadcast packet, they transmit copies of the packet to any local VMs in the group that are members of the tenant associated with the broad cast address.

The information handling systems 100, 200, and 300 may also be used to implement Layer 3 multicasting as well. Two sets of multicast groups may be provisioned by the PME 150. An inner multicast group may be used by VMs on a server, while an outer multicast group may be used by the physical servers. While the outer multicast group may be unique to a single tenant, the inner multicast group addresses may be used more than one within the data center. Using information handling system 300 as an example, a PIM-SM tree may be formed with server 110 as its source. Any VMs on server 110 use the PIM-SM tree as the source. The servers behind a particular TOR join the group by sending IGMP joins to the TOR. The TOR or TORs send PIM joins toward the rendezvous point, one of the global mediators 154 or 156. The multicast distribution tree is built with the rendezvous point as the root of tree. Shortest-path tree switchover may be done if a level of the traffic exceeds a certain threshold. Additionally, PIM source-specific multicast (PIM-SSM) may also be used to build a tree rooted in a single source and to advertise the source, such that members of a multicast group can receive packets directly from server 110, rather than from a rendezvous point situated inside core 102.

In embodiments of information handling systems 100, 200, and/or 300 in which there are multiple tenants present, more than one route distinguisher is present and is used in the system. Combining a route distinguisher and a virtual network identifier, such as a VXLAN identifier, provides a unique tenant identifier. Multicast for broadcast mapping may involve more than one multicast group address, or more than one per tenant. In some embodiments, multiple route reflectors, or global mediators, may be used as load-balancing rendezvous points for groups of tenants. Additionally, information handling systems 100, 200, and 300 may be realized using hardware (e.g. servers, routers, switches, etc.) that does not support bidirectional PIM. This is done in part by using ARP mediation through BGP.

Figure 4:
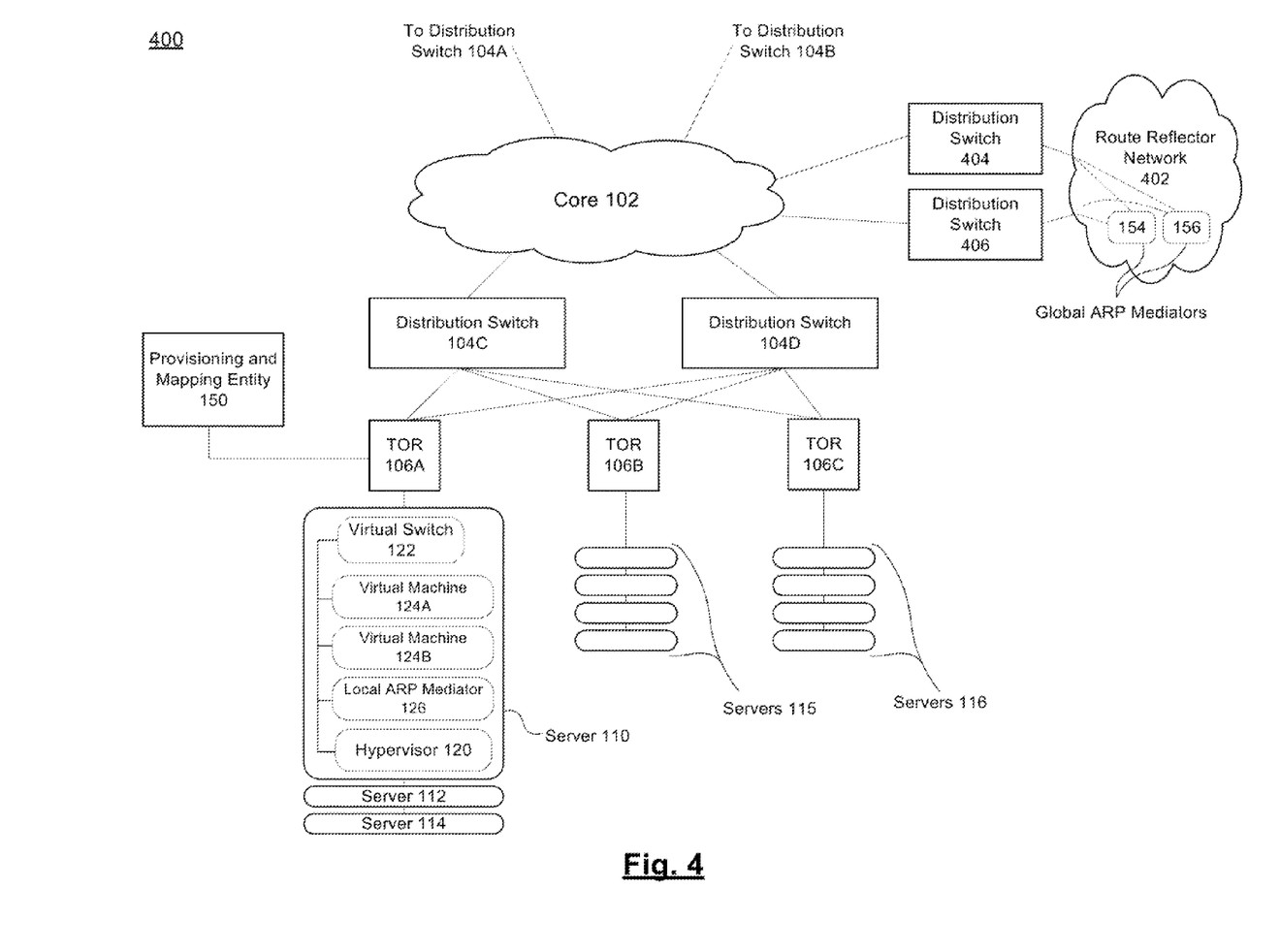
FIG. 4 is a diagram of an information handling system including a route reflector network coupled to a core network.

FIG. 4 illustrates an alternative configuration of an information handling system 400 that may be used to provide L2 overlay over an L3 network. In contrast to information handling system 100 of FIG. 1, information handling system 400 includes a route reflector (RR) network 202 coupled to the core 102 by a plurality of distribution switches. As depicted, distribution switches 204 and 206 serve to couple the core 102 to the RR network 402. In many respects, information handling system 400 operates similar to the manner in which information handling system 100 operates as discussed above. A broadcast, unknown unicast, or Layer 2 multicast packet sent by VM 124A is trapped by virtual switch 122 and communicated to the local mediator 126. The local mediator 126 is configured to send the packet over a TCP connection to a global mediator. While, in information handling system 100 the global mediators 154 and 156 were network devices in the core 102, in information handling system 400 the global mediators 154 and 156 are network devices included in the RR network 402. While the location of the network devices on which the global mediators 154 and 156 is different between information handling system 100 and 400, the operation is largely the same. Thus, each of the global mediators 154 and 156 continue to serve as roots, or rendezvous points, in PIM-SM trees. However, the inclusion of the global mediators 154, 156, and others not depicted in FIG. 4, may more easily provide redundancy to improve the operational reliability of information handling system 400.

Figure 5:
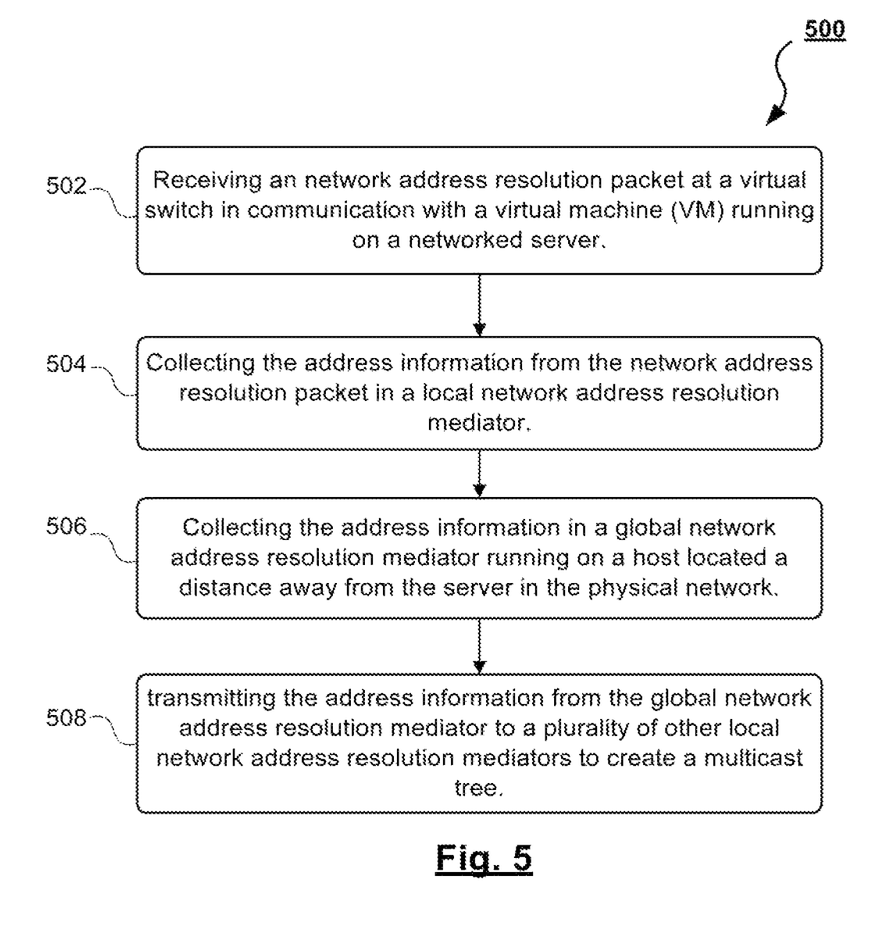
FIG. 5 is a flowchart of a method for overlaying a virtual network over a physical network in a data center.

FIG. 5 is a flowchart of a method 500 for overlaying a virtual network over a physical network. As depicted, method 500 includes a plurality of enumerated steps. However, many embodiments may contain additional steps before, in between, and/or after the enumerated steps without departing from the scope of this disclosure. As depicted, method 500 begins in step 502 in which a virtual switch receives a network address resolution packet from a VM running on a first server on which the virtual switch also runs. The network address resolution packet includes address information for the VM. For example, the address information may include a VM IP address and a VM MAC address. The address information may also include IP and MAC addresses for the first server on which the VM runs.

In step 504, a local network address resolution mediator, also running on the first server, collects the address information from the network address resolution packet. The address information is also collected in a global network address resolution mediator that runs on a network device located a distance away from the first server in the topology of the physical network, in step 506. The global network address resolution mediator transmits or sends the address information from the network address resolution packet to a plurality of other local network address resolution mediators, in step 508. Each of the other local network address resolution mediators is running on a server other than the first server.

This method may be performed using features of any of information handling systems 100, 200, 300, and 400. To better describe an embodiment of method 500, reference is made specifically to information handling system 300 of FIG. 3. Thus, in step 502, virtual switch 122 receives an ARP packet from VM 124A running on server 110. The ARP packet contains address information indicating that the VM IP address of VM 124A is 100.1.1.1. A MAC address for VM 124A may also be included, as well as the IP address of server 110, which is 1.1.1.1.

The virtual switch 122 traps the ARP packet sent by VM 124A and sends it to a local mediator 126, which may be a specialized virtual machine or virtual application running on server 110. In step 504, the local mediator 126 extracts the address information from the ARP packet and stores it for local use in a database associated with local mediator 126, stored in memory on server 110. The local mediator 126 transmits the received address information from the ARP packet, or in some embodiments it transmits the ARP packet itself or a copy thereof, to a global mediator 154. In step 506, the global mediator 154 performs some of the same operations as performed earlier by the local mediator 126. The global mediator 154 collects the address information as it is received from the local mediator 126, and stores it in a database in memory of a network device upon which the global mediator 154 runs. This network device may be one of a plurality of network devices or routers that together form core 102.

In step 508, the global mediator transmits the address information to a plurality of local mediators running on various servers within information handling system 300. The address information may be sent as an ARP packet over a multicast tree that connects each of the local mediators to the global mediator 154 for distribution of network address resolution packets, broadcast packets, unicast packets having unknown destinations, and Layer 2 multicast packets. When such packets are sent by VM 124A, virtual switch 122 is configured to trap them and send them to the local mediator 126. The local mediator 126 then sends them on to the global mediator 154 as the multicast tree may be a PIM-SM tree having its root at the global mediator 154.

Some embodiments of information handling systems 100, 200, 300, and 400 include tangible, non-transient, machine-readable media that include executable code that when run by a processor, may cause the processor to perform the steps of method 500 as described above. The processor may be a network processing unit or a general processing unit on a network device such as the servers, TORs, and/or routers of core 102 as described above. In some embodiments, application specific integrated circuits may be used to provide features such as the local and global mediators.

Some common forms of machine-readable media that may include the steps of method 500 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read. The machine-readable media may be memory in the servers, TORs, and/or routers of core 102 or any other network device described above.

The examples provided above are exemplary only and are not intended to be limiting. One skilled in the art may readily devise other systems consistent with the disclosed embodiments which are intended to be within the scope of this disclosure. As such, the application is limited only by the following claims.

What is claimed is:

1. An information handling system comprising:
a plurality of core devices coupled to each other and to a plurality of distribution devices;
a plurality of top-of-rack devices, each top-of-rack device being coupled to at least one of the plurality of distribution devices;
a plurality of servers coupled to the plurality of top-of-rack devices, at least some of the plurality of servers having hypervisors running thereon that each manage a virtual switch and a plurality of virtual machines (VMs);
a plurality of local network address resolution mediators, each local network address resolution mediator running on one of the plurality of servers and receiving packets including address information from VMs running thereon; and
a global network address resolution mediator running on one of the plurality of core devices, the global network address resolution mediator being in communication with each of the plurality of local network address resolution to collect and distribute the packets from the plurality of VMs among the plurality of local network address resolution mediators, wherein the plurality of local network address resolution mediators are configured to receive request packets requesting the address information associated with the distributed packets and send reply packets including the address information.

2. The information handling system of claim 1, further comprising:
a provisioning and mapping entity coupled to one of the plurality of top-of-rack devices, the provisioning and mapping entity configured to instantiate VMs on the plurality of servers.

3. The information handling system of claim 1, wherein the global network address resolution mediator runs on one of the plurality of core devices and acts as a rendezvous point in a multicast tree having branches to each of the plurality of local network address resolution mediators.

4. The information handling system of claim 1, wherein the plurality of VMs are coupled by a multicast tree such that at least one of the VMs is configured to use address information obtained from some of the packets to transmit data packets to each of the other VMs of the plurality of VMs.

5. The information handling system of claim 1, wherein the plurality of local network address resolution mediators communicates with the global network address resolution mediator in accordance with a Border Gateway Protocol.

6. The information handling system of claim 1, wherein the global network address resolution mediator includes a first address information table associated with a first tenant and a second address information table associated with a second tenant, the second tenant also being associated with a plurality of additional VMs.

7. The information handling system of claim 6, further comprising a first multicast tree associated with the first tenant and a second multicast tree associated with the second tenant.

8. The information handling system of claim 1, wherein the global network address resolution mediator serves as a root in a Protocol Independent Multicast (PIM) tree that includes each of the plurality of local network address resolution mediators as leaves.

9. The information handling system of claim 1, wherein a virtual switch is configured to trap network address resolution packets sent by the VMs and transmit the trapped network address resolution packets to the local network address resolution mediator.

10. The information handling system of claim 9, wherein at least one of the trapped network address resolution packets is a gratuitous network address resolution packet.

11. A method for overlaying a virtual network with a multicast tree over a physical network, the method comprising:
receiving an first network address resolution packet at a virtual switch in communication with a virtual machine (VM) running on a first server, the network address resolution request including address information of the VM;
collecting the address information from the first network address resolution packet in a local network address resolution mediator, the local network address resolution mediator running on the first server;
collecting the address information in a global network address resolution mediator running on a network device located a distance away from the first server in the physical network; and
transmitting the address information from the global network address resolution mediator to a plurality of other local network address resolution mediators, each of the local network address resolution mediators running on a server other than the first server, wherein the plurality of other local network address resolution mediators are configured to receive a second network address resolution packet requesting the address information and send a third network address resolution packet including the address information.

12. The method of claim 11, further comprising sending the network address resolution packet from the VM as a gratuitous network address resolution reply.

13. The method of claim 11, wherein the virtual switch is configured to send received network address resolution packets to the local network address resolution mediator.

14. The method of claim 11, further comprising transmitting the address information from the local network address resolution mediator to the global network address resolution mediator.

15. The method of claim 11, wherein the multicast tree is a Protocol Independent Multicast (PIM) tree having the global network address resolution mediator at a root of the PIM tree.

16. The method of claim 11, further comprising:
trapping one or more of broadcast, unknown unicast, and Layer 2 multicast data packets at the virtual switch; and
sending the trapped data packets to the global network address resolution mediator, the global network address resolution mediator providing a rendezvous point for a multicast tree.

17. The method of claim 11, further comprising receiving updated address information from the global network address resolution mediator at the local network address resolution mediator.

18. A non-transitory, computer-readable medium containing programmed instructions for overlaying a virtual network with a multicast tree over a physical network, wherein the execution of the programmed instructions by one or more processors causes the one or more processors to perform a method, the method comprising:
receiving a first network address resolution packet at a virtual switch in communication with a virtual machine (VM) running on a first server, the first network address resolution packet including address information of the VM;
collecting the address information from the first network address resolution packet in a local network address resolution mediator, the local network address resolution mediator running on the first server;
collecting the address information in a global network address resolution mediator running on a network device located a distance away from the first server in the physical network; and
transmitting the address information from the global network address resolution mediator to a plurality of other local network address resolution mediators, each of the local network address resolution mediators running on a server other than the first server to create a multicast tree, wherein the plurality of other local network address resolution mediators are configured to receive a second network address resolution packet requesting the address information and send a third network address resolution packet including the address information.

19. The computer-readable medium of claim 18, wherein the network device on which the global network address resolution mediator is running is a network appliance.

20. The computer readable medium of claim 18, wherein the method further comprises:
trapping one or more of broadcast, unknown unicast, and Layer 2 multicast packets at the virtual switch; and
sending the trapped packets to the network device on which the global network address resolution mediator is running, the network device also providing a rendezvous point for the multicast tree.

* * * * *